United States Patent [19]
Mason

[11] 3,921,404
[45] Nov. 25, 1975

[54] INTERNAL COMBUSTION AND STEAM POWERED ENGINE

[75] Inventor: Lloyd R. Mason, Boonville, Calif.

[73] Assignee: Tu-N-One PWR, Cloverdale, Calif.

[22] Filed: June 21, 1974

[21] Appl. No.: 481,483

[52] U.S. Cl. .................. 60/618; 60/621; 92/107; 92/110
[51] Int. Cl.² .......................................... F01K 23/10
[58] Field of Search ........ 60/618, 620, 621; 92/107, 92/110, 113

[56] References Cited
UNITED STATES PATENTS
1,601,995  10/1926  Butler et al. .......................... 60/618
2,196,980   4/1940  Cambell ................................ 60/618

Primary Examiner—Allen M. Ostrager
Attorney, Agent, or Firm—Flehr, Hohbach, Test, Albritton & Herbert

[57] ABSTRACT

A combination internal combustion and steam powered engine having a reciprocating piston and two separate chambers which increase and decrease in volume with movement of the piston. The piston is driven in one direction by the combustion of fuel in one chamber, and it is driven in the other direction by the evaporation of water and expansion of steam in the other chamber. The steam is generated by heating water with the heat produced by the combustion of the fuel in the first chamber and introducing measured amounts of the heated water into the second chamber where it evaporates and expands.

8 Claims, 1 Drawing Figure

U.S. Patent  Nov. 25, 1975  3,921,404
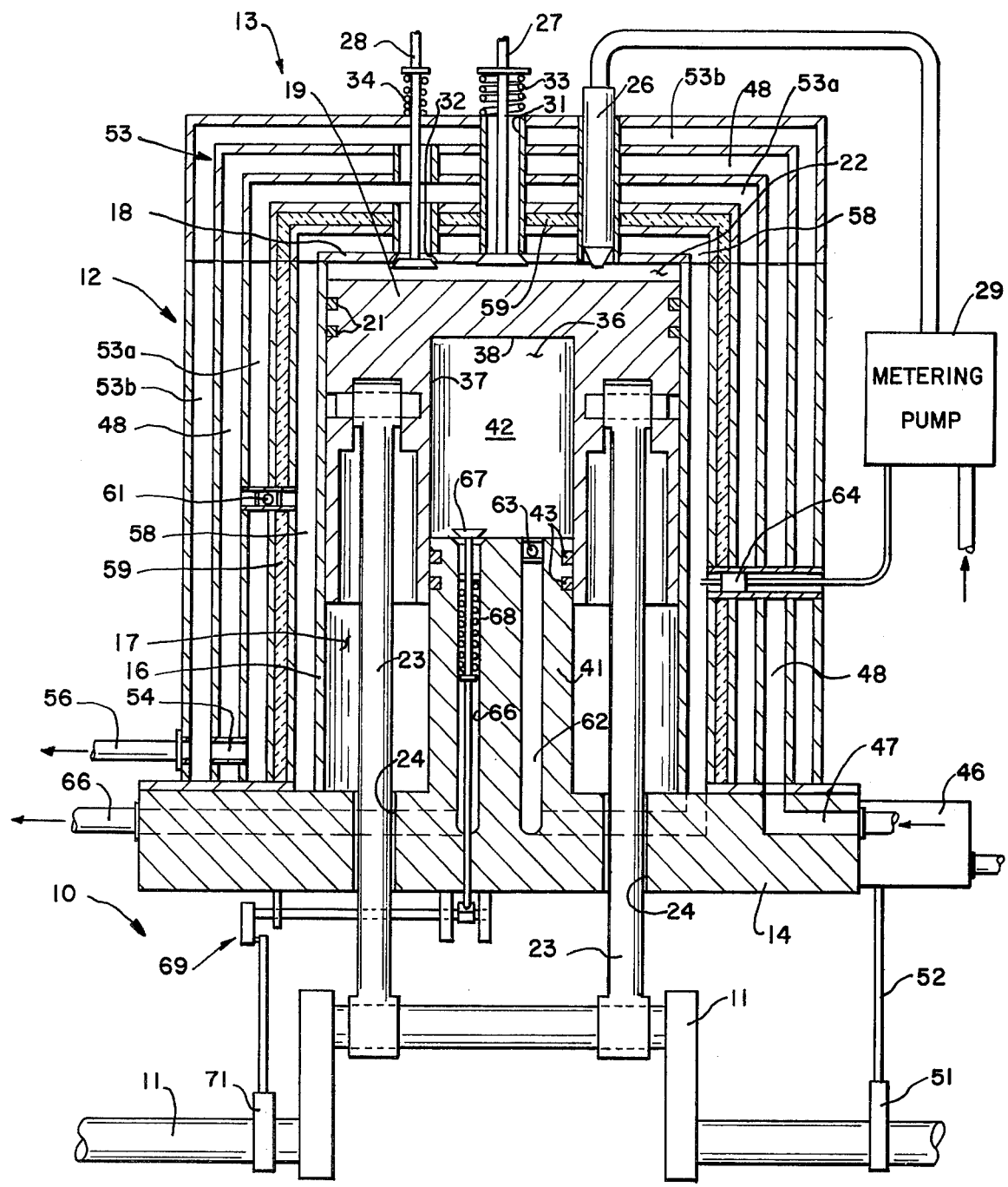

INTERNAL COMBUSTION AND STEAM POWERED ENGINE

BACKGROUND OF THE INVENTION

This invention pertains generally to engines and more particularly to internal combustion engines.

Internal combustion engines heretofore provided generally have multiple stroke operating cycles in which power is delivered during only a portion of the operating cycle of each cylinder. In a four cycle reciprocating piston engine, for example, only one of the four strokes comprising each operating cycle is a power stroke. During the remaining three strokes, while the combustible fuel is introduced into the cylinder, compressed and exhausted from the cylinder, the output shaft is driven by the inertia of a flywheel and/or by pistons in other cylinders.

In addition to producing power for a relatively small portion of the operating cycle, internal combustion engines of the prior art produce a substantial amount of heat energy which is frequently wasted.

SUMMARY AND OBJECTS OF THE INVENTION

The engine of the invention utilizes much of the heat energy produced by an internal combustion engine to produce steam which is applied to the piston or other working member to increase the overall power output of the engine. The engine includes a piston movable in first and second directions, means cooperating with the piston to form first and second separate chambers of variable volume, means for introducing combustible fuel into the first chamber where combustion of the fuel serves to move the piston in the first direction, means utilizing energy produced by the combustion of the fuel to heat water, and means for introducing the heated water into the second chamber where the water evaporates to produce steam, the expansion of the steam serving to move the piston in the second direction. The heat of vaporization required to vaporize the water is absorbed from the surrounding piston and cylinder thereby serving to cool them.

It is in general an object of the invention to provide a new and improved engine utilizing both internal combustion and steam power.

Another object of the invention is to provide an engine of the above character which is more efficient in operation than internal combustion engines heretofore provided.

Another object of the invention is to provide an engine of the above character which utilizes heat energy produced by the combustion of fuel which drives the piston in one direction to heat water to produce steam which drives the piston in the other direction.

Still another object of the invention is to provide an engine of the above character in which the heat of vaporization required to convert water to steam in a chamber is utilized to cool the cylinder walls and piston which form the chamber.

Additional objects and features of the invention will be apparent from the following description in which the preferred embodiment is set forth in detail in conjunction with the accompanying drawing.

BRIEF DESCRIPTION OF THE DRAWING

The drawing is a vertical sectional view, largely schematic, of an engine according to the invention.

DESCRIPTION OF THE PREFERRED EMBODIMENT

The engine includes a crankcase 10 in which a crankshaft 11 is rotatably mounted by suitable bearings not shown. A cylinder assembly 12 and head assembly 13 are mounted above the crankcase on a base 14 which, in the embodiment illustrated, also serves as the top wall of the crankcase. While only one cylinder is shown, it will be understood that the engine can have additional cylinders with pistons connected to the crankshaft, as in internal combustion engines of the prior art.

Cylinder assembly 12 includes an upstanding cylindrical wall 16 defining a cylinder 17 which is closed at its upper end by the lower wall 18 of head assembly 13. An axially movable piston 19 is mounted in cylinder 17 and provided with rings 21 which sealingly engage cylinder wall 16. This piston cooperates with cylinder wall 16 and head wall 18 to form a combustion chamber 22 in the top portion of cylinder 17. Piston 19 is connected to crankshaft 11 by a pair of connecting rods 23 which pass through slotted openings 24 in base 14.

Means is provided for introducing combustible fuel into chamber 22 and exhausting combusted gas from this chamber. In the embodiment illustrated, this means includes a fuel injection nozzle 26, an air intake valve 27, and an exhaust valve 28. Nozzle 26 receives a fuel such as gasoline from a metering pump 29 and delivers the fuel under pressure to chamber 22 under the control of the metering pump. Air intake valve 27 controls communication between the combustion chamber and an air intake port 31 which communicates with a suitable source of air, not shown. Exhaust valve 28 controls communication between chamber 22 and an exhaust port 32. Valves 27 and 28 are biased toward closed positions by springs 33, 34 and actuated by a camshaft, not shown, connected to crankshaft 11 in a conventional manner. Combustion of the fuel/air mixture in chamber 22 is initiated at the outset of each power stroke by a conventional ignition system, not shown.

An axially extending closed bore 36 is formed in piston 19. This bore has a cylindrical side wall 37 and end wall 38, and it opens through the lower end of the piston.

A stationary piston 41 extends upwardly from base 14 into the lower portion of cylinder 17. This piston extends into bore 36, forming an expansion chamber 42 which increases and decreases in volume with movement of piston 19. Rings 43 provide a seal between piston 41 and side wall 37 of the bore.

Means is provided for heating water with heat energy produced by the combustion of fuel in chamber 22 and delivering the heated water to chamber 42 where it turns to steam and expands. This means includes a water pump 46 which delivers water through a passageway 47 in base 14 to a first water jacket 48 in cylinder assembly 12 and head assembly 13. Pump 46 is driven by a cam lobe 51 affixed to crankshaft 11 and a push rod 52 which engages the cam lobe. The pump delivers small quantities of water under pressure to jacket 48 in spurts or pulses, and cam lobe 51 is oriented such that a small measured amount of water is pumped when piston 19 is toward the bottom of its stroke and expansion chamber 42 is near minimum volume.

Water jacket 48 is disposed coaxially of cylinder 17, and water in this jacket is heated by hot exhaust gas from combustion chamber 22. For this purpose, an exhaust jacket 53 is formed in cylinder assembly 12 and head assembly 13. This jacket has an inner section 53a and an outer section 53b which are disposed coaxially of and adjacent water jacket 48. The two sections of the exhaust jacket 53 communicate directly with exhaust port 32. A passageway 54 provides communication between the two sections 53a and 53b, and an exhaust outlet 56 communicates with the jacket 53.

A second water jacket 58 is formed in the cylinder and head assemblies adjacent to cylinder wall 16 and lower wall 18 of the head assembly. Water in this jacket is heated directly by heat produced in the walls of the combustion chamber, and a layer of thermal insulating material 59, such as asbestos, is disposed between water jacket 58 and the inner section 53a of the exhaust jacket. Communication between water jackets 48 and 58 is controlled by a pressure actuated one way valve 61. This valve remains closed as long as the pressure in chamber 48 is below a predetermined level. When the pressure reaches the predetermined level, the valve opens, delivering water from jackete 48 to jacket 58.

Water jacket 58 communicates with a passageway 62 formed in base 14 and stationary piston 41. Communication between this passageway and expansion chamber 42 is controlled by a pressure responsive one-way valve 63 similar to valve 61. Valves 61 and 63 are selected so as to open only upon the exertion of pressure from the pump 46 and not by increased pressure developed by the normal heating of water within the jackets 48 and 58. The amount of water injected by the pump 46 with each stroke of the engine is selected to be that which will readily convert to steam and efficiently expand in the chamber 42 while the piston 19 is being urged upward by the steam itself.

A temperature sensing device 64, such as thermocouple, is provided for monitoring the temperature of the water in jacket 58. In the embodiment illustrated, this device is mounted in cylinder assembly 12 and connected to metering pump 29 for decreasing the amount of fuel delivered to the combustion chamber when the temperature of the water increases.

Means is provided for exhausting steam from expansion chamber 42. This means includes an exhaust passageway 66 formed in base 14 and stationary piston 41. Communication between the passageway and chamber 43 is controlled by an exhaust valve 67 which is biased toward a closed position by a spring 68. The valve is opened by a bell crank assembly 69 which is driven by a cam lobe 71 on crankshaft 11. This lobe is oriented such that the valve is open when piston 19 is moving in the downward direction. Externally of the engine, exhaust passageway 66 is connected to a suitable condenser, not shown, and the output of the condenser is connected to the input of pump 46. A suitable compression release (not shown) may be connected to open the valve 67 when it is desired to disable the steam portion of the engine or to stop the engine when it is still hot enough to generate steam.

Operation and use of the engine can be described briefly. It is assumed that the engine is operating in a four cycle mode with regard to combustion chamber 22, with each cycle comprising an intake stroke in which piston 19 moves down, a compression stroke in which piston 19 moves up, a power stroke in which piston 19 moves down, and an exhaust stroke in which piston 19 moves up. During the intake stroke, fuel and air are introduced into the combustion chamber by fuel injection nozzle 26 and air intake valve 27. The mixture of fuel and air is compressed during the compression stroke, following which it is ignited. Combustion of the mixture drives the piston down during the power stroke. During the exhaust stroke, the exhaust valve 28 is open, and the combusted gas is expelled from the chamber through exhaust port 32 and exhaust jacket 53. The intake stroke for the next cycle commences upon the completion of the exhaust stroke.

Each time piston 19 reaches the end of a downward stroke, pump 46 delivers a small measured pulse of water to jacket 48. The water in this jacket is quickly heated by the hot exhaust gas in exhaust jacket 53. The water injected by the pump 46 into the jacket 48 causes a like amount of water to be driven from the jacket 48, through the valve 61 into the jacket 58. The water is further heated by direct contact with the cylinder wall 16.

Water driven into the jacket 58 causes another like quantity of heated water to be driven from the jacket 58, through valve 63 into chamber 42.

Since the pressure in chamber 42 is substantially lower than the pressure in water jacket 58, the water vaporizes immediately in chamber 42, producing steam which expands, driving piston 19 in the upward direction. The heat of vaporization required to convert the water to steam is extracted from the stationary piston 41 and from the moving piston 19. The piston 19 is thereby cooled from the inside so as to reduce the possibility of its warping.

The expanded steam is exhausted through passageway 66 during the downward stroke of piston 19 and thereafter condensed and returned to pump 46 for further circulation.

When the temperature of the water in jacket 58 reaches a predetermined level, as detected by temperature sensor 64, metering pump 29 decreases the amount of fuel delivered to the combustion chamber. The heated engine may even run, for a short time and at reduced power, without fuel so long as the engine will have enough heat to convert the water to steam.

The invention has a number of important features and advantages. The power produced by the steam in the expansion chamber provides a significant improvement in power output over a conventional internal combustion engine, and it is more efficient in operation. With a four cycle engine, for example, three out of every four strokes are power strokes, and with a two cycle engine every stroke is a power stroke. The engine provides a substantial reduction in the amount of air pollutants emitted for a given power output, and it provides more usable energy for a given quantity of fuel than a conventional internal combustion engine.

The engine is smaller in size and weight than a conventional engine of comparable power, and it consumes less fuel than a conventional engine. The engine is also smaller than other engines which have attempted to utilize the waste heat of internal combustion engines to drive a steam engine. These other engines have required a large steam boiler which is not required here. In the engine of this invention only small quantities of water are heated. The small quantity of water not only permits a small size engine but also an engine which can quickly reach operation temperatures. There is no need to build a head of steam. Moreover, engine wear is substantially reduced because the engine can deliver a given power output at a lower operating speed than a conventional engine. It should also be recognized that the injection of water into the chamber 42 serves to cool the piston 19 from the inside much as the usual water jacket does from the outside. This helps maintain the piston at a temperature close to the temperature of the cylinder wall and thereby minimizes the possibility of piston seizure.

While the engine has been described with specific reference to a four cycle reciprocating piston engine, it can be utilized with other types of engines, including two cycle and diesel engines.

It is apparent from the foregoing that a new and improved engine has been provided. While only the preferred embodiment has been described, as will be apparent to those familiar with the art, certain changes and modifications can be made without departing from the scope of the invention as defined by the following claims.

I claim:

1. In an engine: an axially extending cylinder having a side wall, a cylinder head forming a closure at one end of the cylinder, an axially movable piston mounted in the cylinder and cooperating with the cylinder wall and cylinder head to form a first chamber of variable volume, an axially extending stationary piston mounted at the end of the cylinder opposite the cylinder head, an axially extending closed bore formed in the movable piston and opening through the end of said piston opposite the cylinder head for receiving the stationary piston therein, the stationary piston cooperating with the walls of the bore to form a second chamber of variable volume, means for introducing combustible fuel into the first chamber where combustion of the fuel serves to move the movable piston away from the cylinder head, means for exhausting combusted gas from the first chamber, means for heating water with heat energy produced by the combustion of fuel in the first chamber and introducing the heated water into the second chamber where it vaporizes to produce steam, expansion of the steam serving to cool said movable piston and to move it toward the cylinder head, and means for exhausting expanded steam from the second chamber.

2. The engine of claim 1 wherein the means for heating water and introducing heated water into the second chamber comprises: a first water jacket disposed coaxially of the chamber wall, means for delivering water under pressure to the first water jacket, an exhaust jacket adjacent to the first water jacket for receiving hot exhaust gas from the first chamber, a second water jacket adjacent to the cylinder wall and heated thereby, means for delivering water from the first water jacket to the second water jacket and for delivering water from the second water jacket to the second chamber upon delivery of a pulse of water from the pump.

3. The engine of claim 2 wherein the means for delivering water to the first water jacket includes a pump for delivering a pressurized pulse of water when the movable piston is at the predetermined position in the cylinder and the means for delivering water to the second water jacket and second chamber comprise pressure responsive valves adapted to open in response to the pressure produced by the pump in delivering the pulse to the first water jacket.

4. The engine of claim 3 wherein the movable piston is connected to a crankshaft and the pump is driven by the crankshaft.

5. The engine of claim 2 wherein the exhaust jacket is formed in two sections disposed on opposite sides of the first water jacket.

6. The engine of claim 2 further including thermal insulation disposed between the second water jacket and the exhaust jacket.

7. The engine of claim 1 wherein the means for exhausting steam includes a valve mounted on the stationary piston and means for opening the valve when the movable piston is at a predetermined position in the cylinder.

8. The engine of claim 1 further including means for monitoring the temperature of the water and decreasing the amount of combustible fuel delivered to the first chamber in response to an increase in the temperature of the water.

* * * * *